No. 872,196.

PATENTED NOV. 26, 1907.

F. M. PITTMAN.
STREET SWEEPER.
APPLICATION FILED MAY 2, 1906.

4 SHEETS—SHEET 4.

Witnesses
Louis R. Heinrichs
C. C. Hines

Inventor
F. M. Pittman
By Victor J. Evans
Attorney

UNITED STATES PATENT OFFICE.

FRANCIS M. PITTMAN, OF LOGANSPORT, INDIANA.

STREET-SWEEPER.

No. 872,196.　　　Specification of Letters Patent.　　　Patented Nov. 26, 1907.

Application filed May 2, 1906. Serial No. 314,804.

*To all whom it may concern:*

Be it known that I, FRANCIS M. PITTMAN, a citizen of the United States of America, residing at Logansport, in the county of Cass and State of Indiana, have invented new and useful Improvements in Street-Sweepers, of which the following is a specification.

This invention relates to improvements in street sweepers, its object being to provide a simple and comparatively inexpensive construction of automobile sweeper which is designed for both sprinkling and sweeping and will take up the dirt from a road or street in a cleanly and effectual manner.

Another object is to provide an apparatus of this character in which the parts are under the ready and complete control of the operator.

Figure 1:
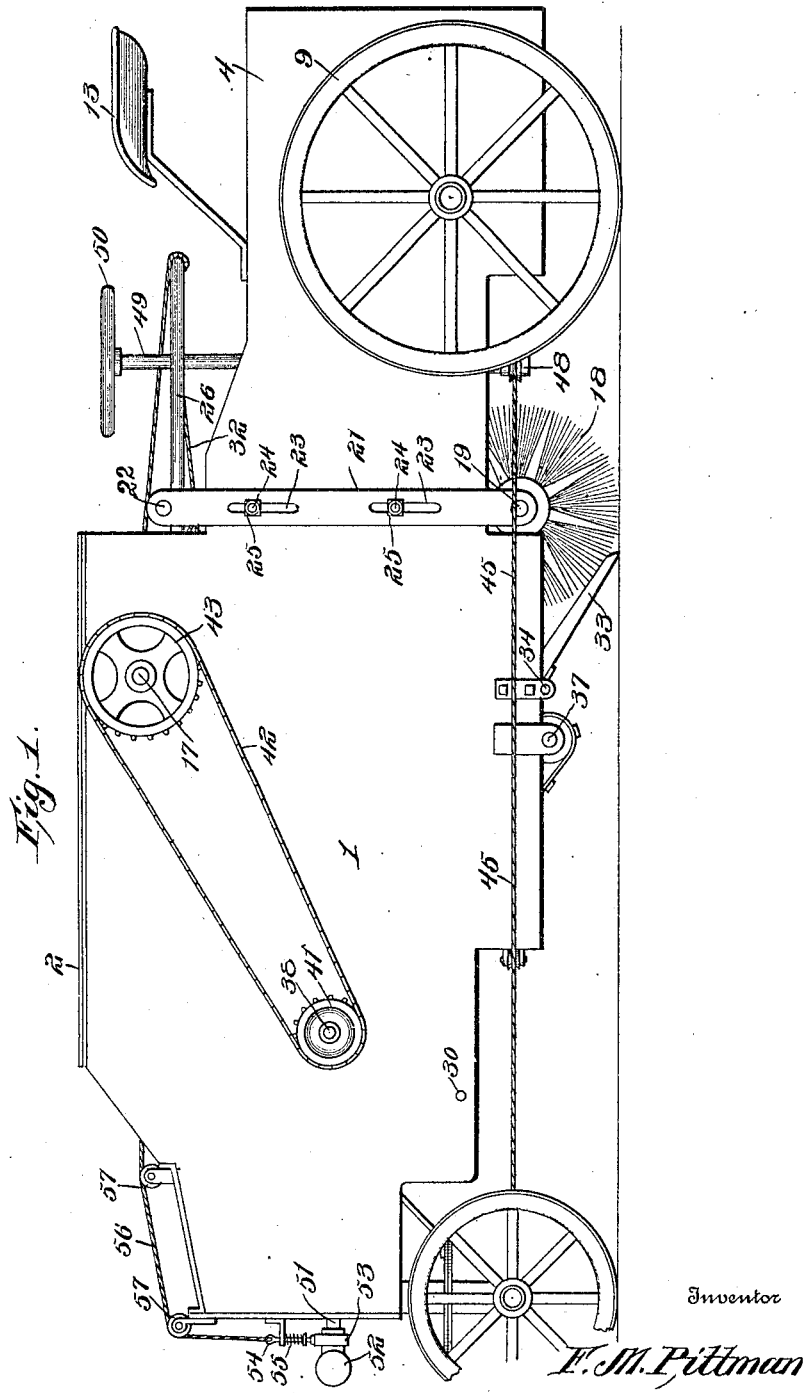
Figure 2:
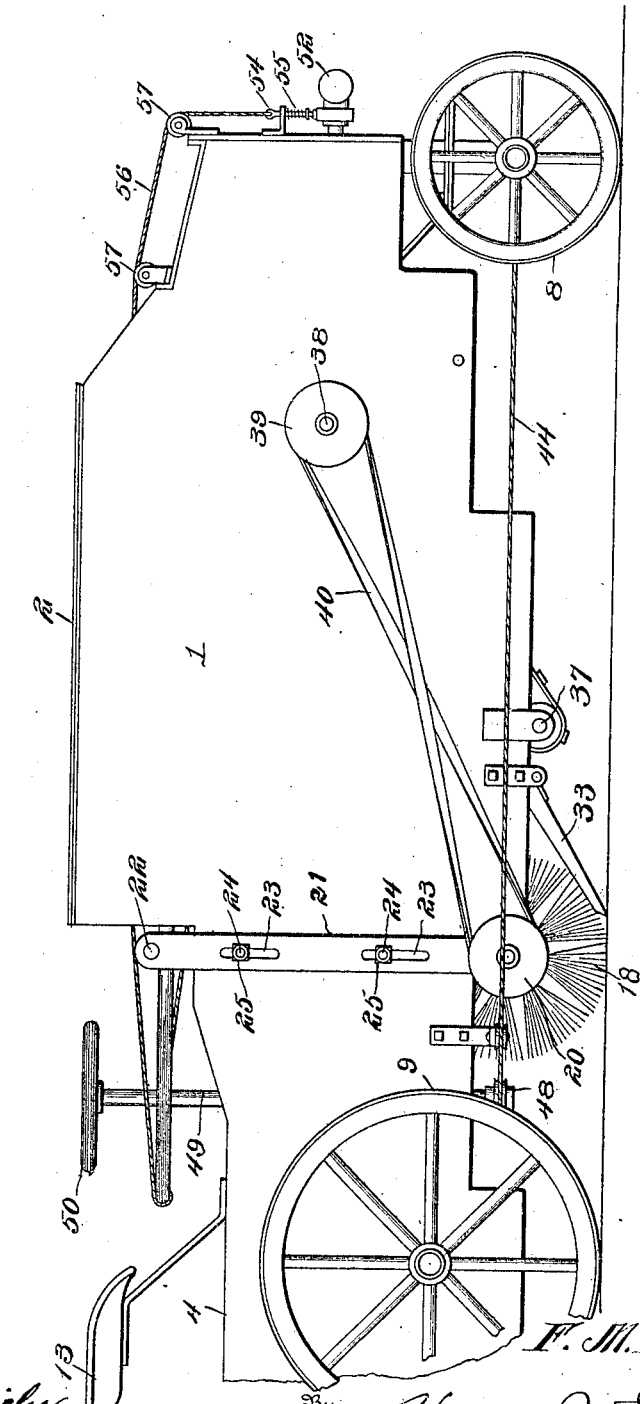
Figure 3:
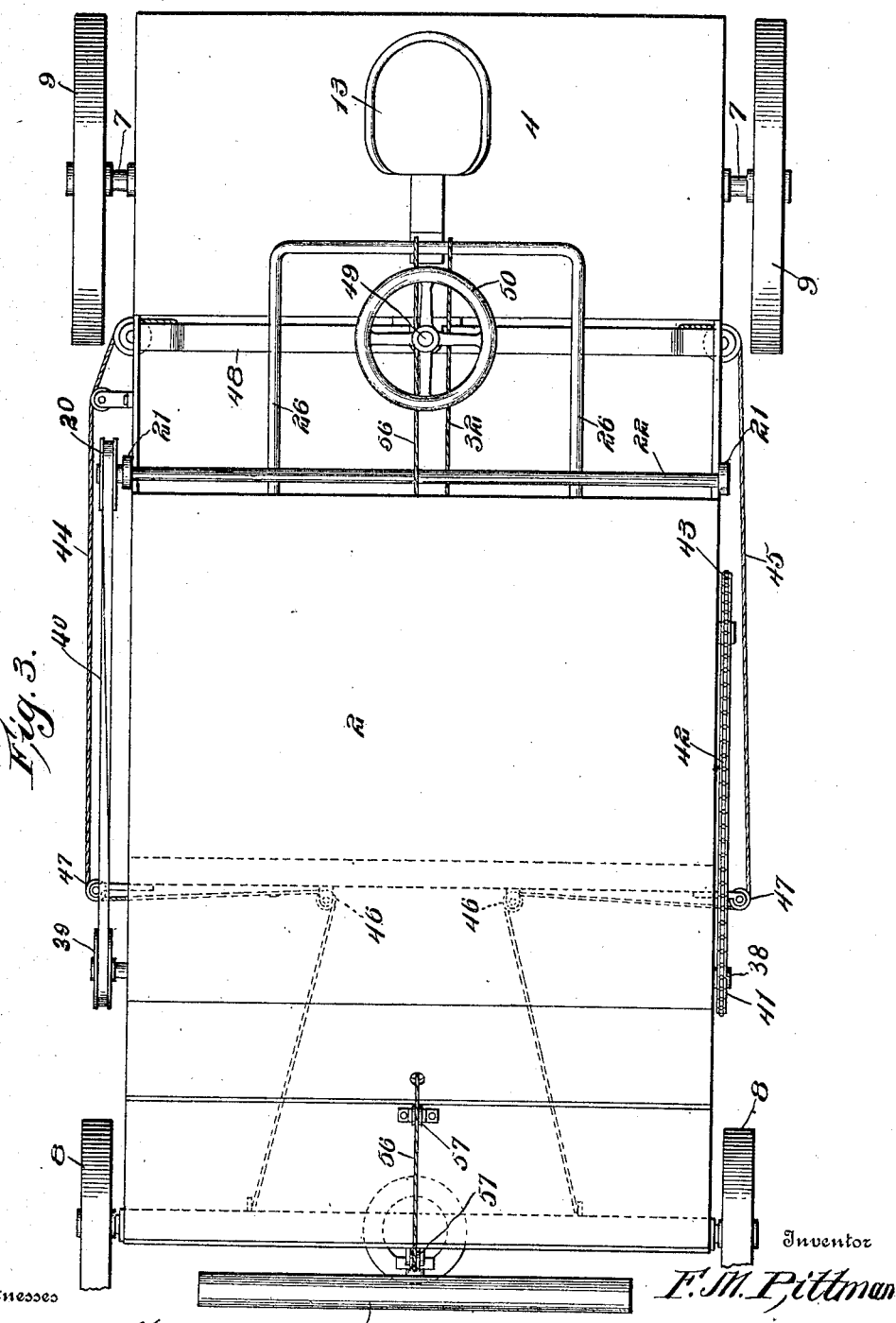
Figure 4:
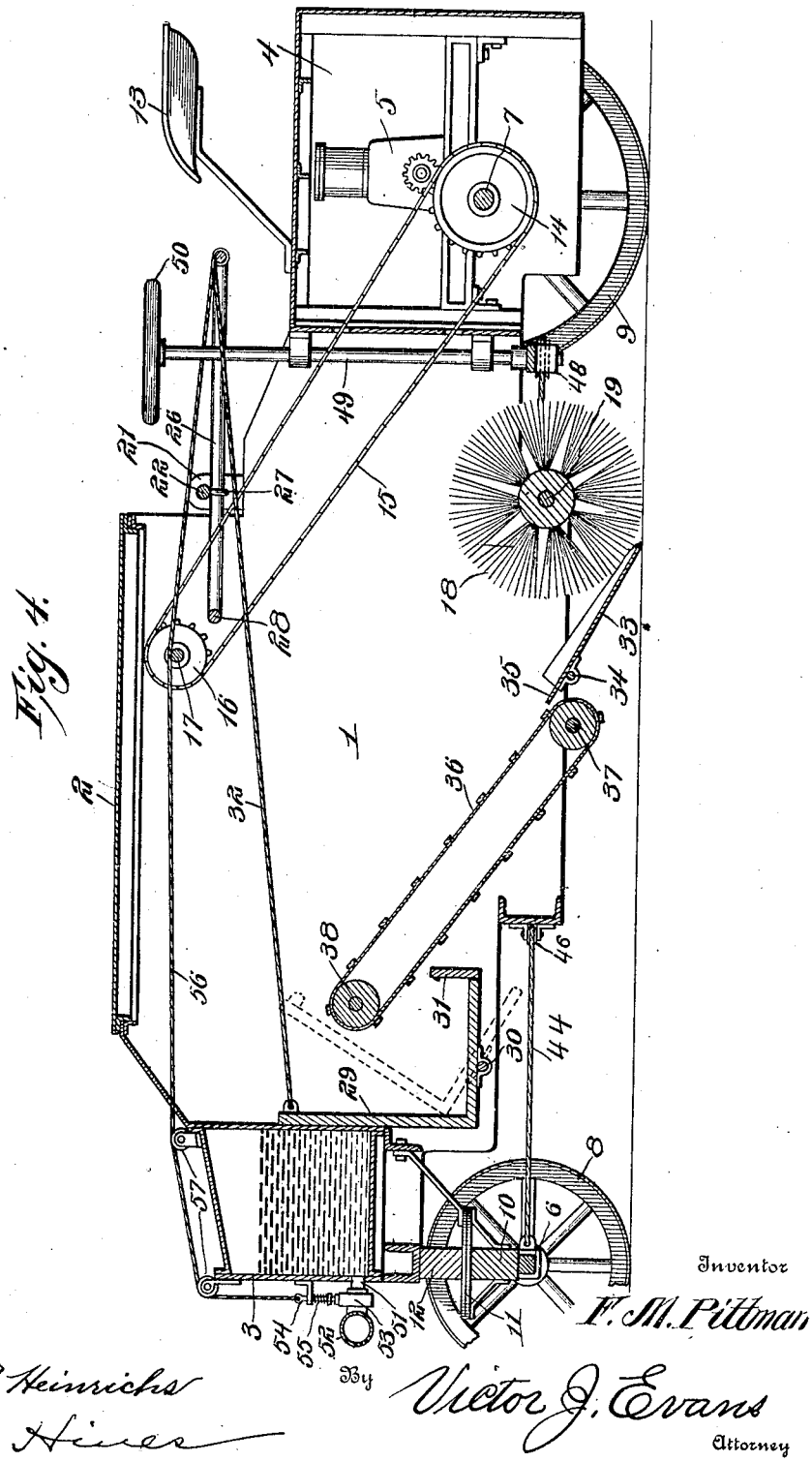

In the accompanying drawings, Figure 1 is a view in elevation of one side of a street sweeper embodying my invention. Fig. 2 is an opposite side elevation of the same. Fig. 3 is a top plan view of the sweeper. Fig. 4 is a vertical longitudinal section thereof.

Referring to the drawings, 1 designates the body or casing of the sweeper, closed at its top by a removable door or lid 2 through which access may be obtained to the interior thereof for ready cleaning, repairs, or replacement of the contained parts. The casing is provided with front and rear compartments 3 and 4, the former serving as a sprinkling tank for containing a desired quantity of water and the latter as a casing for a suitable engine or motor 5. The frame is mounted at front and rear upon axles 6 and 7, which respectively support front steering wheels 8 and rear driving wheels 9, the rear axle 7 being suitably geared to the drive shaft of the motor and serving as a primary drive shaft. The front axle 6 is secured to a bolster 10 connected with the front portion of the frame through a turn table or fifth wheel 11, the upper section of which is fastened to a cross bar 12 fixed to the frame, whereby the shaft 6 with its wheels are adapted to turn for steering purposes in the usual manner.

The rear compartment 4 supports a driver's seat 13, and fixed to the rear axle 7 within said compartment is a drive sprocket wheel 14 connected by a chain 15 with a sprocket wheel 16 on a shaft 17 extending transversely across the upper rear portion of the body or casing. This shaft 17 transfers motion through suitable connections to the sweeping brush and conveyer, as hereinafter described.

A rotary sweeping brush 18 is arranged at the lower rear portion of the frame and is mounted upon a shaft 19 provided at one end with a pulley 20 and journaled in supporting standards 21 arranged on opposite sides of the frame, said standards being connected at their upper ends by a cross rod or bar 22. Each standard is vertically adjustable on the frame, and to this end is provided with one or more longitudinal slots 23 receiving bolts 24 on the frame, each bolt being provided with a clamping nut 25 to retain the standard in position and enable the same to be clamped to hold the brush at any desired elevation. The standards 21 and rod 22 thus form a vertically adjustable brush carrying frame which is under control of the driver or operator through the medium of a bail shaped operating handle 26 connected by clips 27 with the rod 22 and attached at its forward end to a rock shaft 28 journaled on the frame. By means of this handle or lever 26, whose operating portion is arranged in close juxtaposition to the seat 13, the operator may throw the brush into and out of operation and adjust it to any desired elevation in an obvious manner. The brush may be fastened in adjusted position through the medium of the bolts and nuts previously described, or through the use of any other preferred fastening means.

Arranged at the front end of and within the body or casing 1 is an L-shaped dirt receiving bin or trough 29 which is mounted to rock upon a transverse pivotal support 30. The back portion of this trough is arranged to bear when the trough is in receiving position against the rear wall of the tank 3, and the rear edge of the bottom said trough is adapted to close against a short transverse partition 31. An operating rope 32 is attached to the upper end of the vertical portion of the trough and extends through the frame and is attached at its rear end to the handle of the lever 26. By pulling upon this rope the operator may conveniently dump the trough, which returns by gravity to normal position.

The dirt is swept by the brush 18 into an inclined pan or tray 33, the lower rear edge of which is adapted to ride over the surface of the road or street. This pan is pivotally mounted, as at 34, at its upper forward end so that it may yield to prevent injury thereto in passing over rough and irregular surfaces. The bottom of the pan has a discharge lip or extension 35 located at the upper end thereof and over which the dirt is fed forward onto an endless conveyer 36. The conveyer 36 extends on an upward and forward incline from a point beneath the extension 35 to a point above the top of the trough 29, and operates to convey the dirt taken up by the brush to said trough. The said conveyer is mounted upon transverse shafts 37 and 38 journaled in suitable bearings on the sides of the frame, one end of the upper shaft 38 being extended and provided with a pulley 39 connected by a cross belt 40 with the pulley 20 on the brush shaft. The other end of the shaft 38 is extended through the opposite side of the frame and carries a sprocket wheel 41 connected by a chain 42 to a sprocket wheel 43 on one of the ends of the transverse shaft 17. By this construction and arrangement of the gearing motion is imparted from the driving axle 7 to the shaft 17, from thence through the chain and sprocket gearing to the shaft 38 of the conveyer, and from said shaft 38 to the brush shaft.

Ropes, chains or cables 44 and 45 are attached at their front ends to the axle 6 on opposite sides of the fifth wheel and thence pass rearwardly over sets of guide pulleys 46 and 47 to the rear of the machine, where they are attached to a transverse steering bar 48 centrally connected with an upwardly extending steering post or shaft 49 journaled in bearings upon the front of the compartment 4 and provided at its upper end with a hand wheel or equivalent operating device 50. The upper end of said post projects through the bail shaped lever 26 and is disposed in convenient position to the driver's seat 13. By means of these connections the machine may be steered in an obvious manner.

The tank or compartment 3 is designed to contain a suitable store of water, and may be provided with any type of filling attachment. From said tank extends an outlet pipe 51 connected with a transversely arranged sprinkler head 52 and in which is arranged a controlling valve 53. The valve stem 54 is slidably mounted and adapted to be forced downwardly by a spring 55 to automatically close the valve and cut off the flow of water. A cord or like connection 56 is attached at one end to the valve stem and extends upwardly and rearwardly over guide pulleys 57, and thence through the frame and is attached at its opposite end to the handle of the lever 26.

From the foregoing description, taken in connection with the accompanying drawings, the construction and mode of operation of the machine will be readily understood, and it will be seen that the invention provides a simple type of apparatus adapted to be propelled by its own power and having an effective and simple arrangement of devices for sweeping up the dirt, conveying the same to the trough and tilting the latter to dump the sweepings at suitable intervals in the operation of the machine. It will also be observed that the operating devices of the brush adjusting frame, dumping trough and sprinkler valve are so arranged as to be conveniently operated from the driver's seat. The motor controlling mechanism will also be arranged in practice so as to be manipulated by the driver.

Having thus described the invention, what I claim is:

1. A street sweeper comprising a wheeled frame including a body having rear side extensions and a motor casing connected therewith, said motor casing having a driver's seat mounted thereon, a shaft arranged at the lower rear portion of the body, a rotary brush carried by said shaft, a brush carrying frame comprising standards supporting the shaft and arranged on the outer sides of the extensions, said standards being adjustably connected with said extensions and connected at their upper ends by a transverse rod, means for securing the standards in adjusted position, and an operating lever pivotally mounted upon the casing and connected with said rod, and extending rearwardly above the forward portion of the motor casing in juxtaposition to the driver's seat.

2. A street sweeper comprising a wheeled frame, including a body having rear side extensions and a motor casing connected therewith, said motor casing having a driver's seat mounted thereon, slotted standards arranged on the outer sides of the extensions, securing bolts extending through the extensions and slots in the standards, a rotary brush journaled in the lower ends of the standards at the lower rear portion of the body, a rod connecting the standards at the upper rear portion of the body, and a bail-shaped operating lever having its arms connected with the rod and its forward ends pivotally mounted upon the body, the return portion of said lever being arranged above the forward portion of the motor casing in proximity to the driver's seat.

In testimony whereof, I affix my signature in presence of two witnesses.

FRANCIS M. PITTMAN.

Witnesses:
ALBERT H. SMITH,
HARVEY A. BROWN.